(12) United States Patent
Kuramoto

(10) Patent No.: US 9,436,782 B2
(45) Date of Patent: Sep. 6, 2016

(54) TRANSMISSION DEVICE AND TEMPERATURE CONTROL METHOD

(71) Applicant: FUJITSU LIMITED, Kawasaki-shi, Kanagawa (JP)

(72) Inventor: Michio Kuramoto, Meguro (JP)

(73) Assignee: FUJITSU LIMITED, Kawasaki (JP)

( * ) Notice: Subject to any disclaimer, the term of this patent is extended or adjusted under 35 U.S.C. 154(b) by 278 days.

(21) Appl. No.: 13/893,573

(22) Filed: May 14, 2013

(65) Prior Publication Data
US 2014/0025882 A1 Jan. 23, 2014

(30) Foreign Application Priority Data
Jul. 19, 2012 (JP) .................................. 2012-160812

(51) Int. Cl.
G06F 17/30 (2006.01)
H04L 12/70 (2013.01)

(52) U.S. Cl.
CPC ......... *G06F 17/30982* (2013.01); *H04L 47/00* (2013.01)

(58) Field of Classification Search
CPC ..... G01K 7/42; G06F 1/206; G06F 11/3037; G06F 11/30–11/3062; G06F 17/01; H04L 12/569; H04L 12/5689; H04L 29/14
See application file for complete search history.

(56) References Cited

U.S. PATENT DOCUMENTS

| | | | | |
|---|---|---|---|---|
| 4,647,746 A * | 3/1987 | Eke | ...................... | H05B 6/6411 219/681 |
| 4,878,184 A * | 10/1989 | Okada | ...................... | G01K 7/42 374/107 |
| 4,922,230 A * | 5/1990 | Ohtani | ................... | G08B 17/06 340/501 |
| 6,021,076 A * | 2/2000 | Woo | ........................ | G06F 1/206 365/211 |
| 6,315,379 B1 * | 11/2001 | Adams | ................... | B41J 2/0454 347/14 |
| 6,373,768 B2 * | 4/2002 | Woo | ........................ | G11C 7/04 365/211 |
| 6,470,238 B1 * | 10/2002 | Nizar | .................. | G06F 13/1668 700/153 |
| 6,557,072 B2 * | 4/2003 | Osborn | ................... | G06F 1/206 365/212 |

(Continued)

FOREIGN PATENT DOCUMENTS

| | | |
|---|---|---|
| JP | 2004-289806 | 10/2004 |
| JP | 2009-253481 | 10/2009 |

(Continued)

OTHER PUBLICATIONS

Jonathan Koomey, Estimating Total Power Consumption by Servers in the U.S. and the World, Analytics Press. Feb. 2007.*

(Continued)

*Primary Examiner* — Jared Rutz
*Assistant Examiner* — Khoa D Doan
(74) *Attorney, Agent, or Firm* — Staas & Halsey LLP

(57) ABSTRACT

There is provided a transmission device including an associative memory in which, when data is specified, contents of the memory are searched for the data and an address of a location in which the data has been found is read out; a detector configured to detect an access rate to the associative memory; an estimation unit configured to estimate a temperature of the associative memory, based on the access rate to the associative memory; a prediction unit configured to predict a time period until the temperature of the associative memory reaches a specified temperature, based on the temperature estimated by the estimation unit; and an access controller configured to control an access to the associative memory, based on the time period predicted by the prediction unit.

13 Claims, 14 Drawing Sheets

(56) References Cited

U.S. PATENT DOCUMENTS

| | | | | |
|---|---|---|---|---|
| 6,836,704 | B2* | 12/2004 | Walsh | G11C 7/1045 365/211 |
| 7,099,735 | B2* | 8/2006 | Jain | G01K 7/42 374/E7.042 |
| 7,761,191 | B1* | 7/2010 | Wagner | G06F 1/3203 438/109 |
| 8,380,942 | B1* | 2/2013 | Corddry | G06F 12/0246 711/154 |
| 8,416,571 | B2* | 4/2013 | Mizumura | H05K 7/20836 361/679.48 |
| 8,429,346 | B1* | 4/2013 | Chen | G06F 3/0689 709/213 |
| 8,566,483 | B1* | 10/2013 | Chen | G06F 3/0605 710/18 |
| 9,043,530 | B1* | 5/2015 | Sundaram | G06F 3/068 711/100 |
| 2003/0060934 | A1* | 3/2003 | Walsh | G11C 7/1045 700/299 |
| 2003/0125900 | A1* | 7/2003 | Orenstien | G06F 1/3203 702/132 |
| 2004/0267409 | A1* | 12/2004 | De Lorenzo | G06F 13/1668 700/299 |
| 2006/0101304 | A1* | 5/2006 | Miura | G06F 11/1076 714/6.32 |
| 2007/0067136 | A1* | 3/2007 | Conroy | G06F 1/206 702/130 |
| 2007/0140030 | A1* | 6/2007 | Wyatt | G11C 5/00 365/212 |
| 2008/0040563 | A1* | 2/2008 | Brittain | G06F 1/3225 711/154 |
| 2008/0059111 | A1* | 3/2008 | Sri-Jayantha | G06F 1/206 702/132 |
| 2008/0154536 | A1* | 6/2008 | McMillan | G06F 1/206 702/132 |
| 2009/0088873 | A1* | 4/2009 | Avery | G06F 1/206 700/51 |
| 2009/0252055 | A1 | 10/2009 | Yazaki et al. | |
| 2010/0023678 | A1* | 1/2010 | Nakanishi | G06F 1/206 711/103 |
| 2010/0046533 | A1* | 2/2010 | Kuramoto | H04L 47/10 370/401 |
| 2010/0061260 | A1* | 3/2010 | Bugenhagen | H04L 12/2602 370/252 |
| 2010/0100672 | A1* | 4/2010 | Kuramoto | G06F 17/30982 711/108 |
| 2011/0029150 | A1* | 2/2011 | Wyatt | 700/299 |
| 2011/0107037 | A1* | 5/2011 | Yoshida | G06F 11/3037 711/154 |
| 2013/0046999 | A1* | 2/2013 | Jung | G06F 1/206 713/300 |
| 2013/0254483 | A1* | 9/2013 | Iida | G06F 3/061 711/117 |
| 2013/0282149 | A1* | 10/2013 | Kuntagod | H04L 67/12 700/73 |
| 2014/0126081 | A1* | 5/2014 | Huang | G11B 19/048 360/75 |
| 2015/0006440 | A1* | 1/2015 | Nicholson | G06N 5/04 706/11 |
| 2015/0207735 | A1* | 7/2015 | Kuramoto | H04L 45/742 370/392 |

FOREIGN PATENT DOCUMENTS

| | | |
|---|---|---|
| WO | 2008/093606 A1 | 8/2008 |
| WO | 2008/129638 A1 | 10/2008 |
| WO | WO 2008129638 A1 * | 10/2008 |

OTHER PUBLICATIONS

David Brooks. Dynamic Thermal Management for High-Performance Microprocessors. IEEE, The Seventh International Symposium on High-Performance Computer Architecture. Jan. 2001.*

Japanese Office Action dated Mar. 29, 2016 in corresponding Japanese Patent Application No. 2012-160812.

* cited by examiner

FIG. 6

| TCAM ACCESS RATE FOR EACH 30 MINUTE (MEGA TIMES/SEC) | ESTIMATED TCAM TEMPERATURE (°C) |
|---|---|
| 1 | 30 |
| 2 | 35 |
| 3 | 40 |
| 4 | 45 |
| 5 | 50 |
| 6 | 55 |
| 7 | 60 |
| 8 | 65 |
| 9 | 70 |
| 10 | 75 |
| 11 | 80 |
| 12 | 85 |
| 13 | 90 |
| 14 | 95 |
| 15 | 100 |

| SETTING | THRESHOLD TEMPERATURE (°C) | MONITOR TIME PERIOD (SEC) | PREDICTION INTERVAL (SEC) | PRESENCE OR ABSENCE OF NOTIFICATION | RESTRICTION METHOD |
|---|---|---|---|---|---|
| SETTING 1 | 100 | 1 | 60 | PRESENCE | DISCARD |
| SETTING 2 | 85 | 10 | 60 | PRESENCE | FLOODING |
| SETTING 3 | 75 | 10 | ABSENCE | PRESENCE | POLICING BY COLOR |
| SETTING 4 | 60 | 30 | 600 | ABSENCE | BLOCK POWER SUPPLY-OFF |
| SETTING 5 | 50 | 1800 | 6000 | ABSENCE | ENTRY DELETION |

FIG. 13A

| | MEASURED VALUE OF NUMBER OF ACCESSES | | | |
|---|---|---|---|---|
| BLOCK ID | NUMBER OF ACCESSES TO TCAM | COLOR-SPECIFIC NUMBER OF ACCESSES TO TCAM | | |
| | | GREEN | YELLOW | RED |
| BLOCK A | 100 | 100 | 0 | 0 |
| BLOCK B | 6000 | 2000 | 2000 | 2000 |
| BLOCK C | 800 | 0 | 100 | 700 |
| BLOCK D | 3 | 0 | 0 | 3 |
| BLOCK E | 999999999 | 99 | 0 | 1E+09 |

FIG. 13B

| SETTING | | | | | |
|---|---|---|---|---|---|
| THRESHOLD VALUE OF NUMBER OF ACCESSES | | UPPER CLASS OF NUMBER OF ACCESSES | | COLOR-SPECIFIC OPERATION | |
| SETTING VALUE | OPERATION | SETTING VALUE | OPERATION | SETTING VALUE 1 | SETTING VALUE 2 |
| 500 | OFF | 2 | OFF | GREEN = 50 & YELLOW = 0 | GREEN ON YELLOW OFF |
| | ON | | ON | | GREEN OFF YELLOW OFF |
| | ON | | OFF | | GREEN ON YELLOW ON |
| | OFF | | OFF | | GREEN ON YELLOW OFF |
| | ON | | ON | | GREEN OFF YELLOW ON |

FIG. 14A

MEASURED VALUE OF NUMBER OF ACCESSES

| BLOCK ID | NUMBER OF ACCESSES TO TCAM | COLOR-SPECIFIC NUMBER OF ACCESSES TO TCAM | | |
|---|---|---|---|---|
| | | GREEN | YELLOW | RED |
| ENTRY A | 100 | 100 | 0 | 0 |
| ENTRY B | 6000 | 2000 | 2000 | 2000 |
| ENTRY C | 800 | 0 | 100 | 700 |
| ENTRY D | 3 | 0 | 0 | 3 |
| ENTRY E | 999999999 | 99 | 0 | 1E+09 |

FIG. 14B

SETTING

| THRESHOLD VALUE OF NUMBER OF ACCESSES | | UPPER CLASS OF NUMBER OF ACCESSES | | COLOR-SPECIFIC OPERATION | |
|---|---|---|---|---|---|
| SETTING VALUE | OPERATION | SETTING VALUE | OPERATION | SETTING VALUE 1 | SETTING VALUE 2 |
| 500 | OFF | 2 | OFF | GREEN = 50 & YELLOW = 0 | GREEN ON YELLOW OFF |
| | ON | | ON | | GREEN OFF YELLOW OFF |
| | ON | | OFF | | GREEN ON YELLOW ON |
| | OFF | | OFF | | GREEN ON YELLOW OFF |
| | ON | | ON | | GREEN OFF YELLOW ON |

TRANSMISSION DEVICE AND TEMPERATURE CONTROL METHOD

CROSS-REFERENCE TO RELATED APPLICATION

This application is based upon and claims the benefit of priority from the prior Japanese Patent Application No. 2012-160812 filed on Jul. 19, 2012, the entire contents of which are incorporated herein by reference.

FIELD

The embodiments discussed herein are related to a transmission device and a temperature control method in the transmission device.

BACKGROUND

With the prevailing of network communication, high speed routing device is desired. The routing device is, for example, a router or a switch, and includes a plurality of input ports and a plurality of output ports. In addition, the routing device identifies the output port on the basis of control information that is stored in a header of an input packet, and transfers the packet through the identified output port. As described above, the routing device controls a route of the packet through a network.

With such a high speed operation of the routing device, the power consumption of the routing device increases, and an increase in a temperature of a control circuit that is installed in the routing device is caused. Thus, it is desired to suppress an increase of the power consumption. Among electronic components installed in the routing device, a memory, in particular, produces a large amount of heat. Thus, it is desired to suppress an increase of the power consumption of the memory.

As techniques that suppress an increase of the power consumption, a technique has been proposed that measures and predicts loads for each importance level of the packets using a packet transfer device.

Japanese Laid-open Patent Publication Nos. 2009-253481 and 2004-289806 are examples of the related art.

SUMMARY

According to an aspect of the invention, a transmission device includes an associative memory in which, when data is specified, contents of the memory are searched for the data and an address of a location in which the data has been found is read out; a detector configured to detect an access rate to the associative memory; an estimation unit configured to estimate a temperature of the associative memory, based on the access rate to the associative memory; a prediction unit configured to predict a time period until the temperature of the associative memory reaches a specified temperature, based on the temperature estimated by the estimation unit; and an access controller configured to control an access to the associative memory, based on the time period predicted by the prediction unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating a relationship of an average access rate to the TCAM and an estimation temperature of the TCAM;

FIGS. 13A and 13B are diagrams illustrating examples of access restriction; and

FIGS. 14A and 14B are diagrams illustrating other examples of the access restriction.

DESCRIPTION OF EMBODIMENTS

A calorific value of a memory depends on an access rate to the memory. In a network having a large capacity, an access rate to the memory may become greatly high depending on a pattern of traffic. Thus, a temperature of the mere memory sometimes locally increases in the routing device.

Recently, in order to achieve the speeding-up of the routing device, a content addressable memory (CAM) that is one of associative memories is utilized. The CAM includes a function that searches a memory for data in addition to a common memory function, so that a temperature increase of the CAM has a tendency to become high as compared with that of a regular memory.

In the embodiments, there is provided a configuration and a method of suppressing an increase in a temperature of an associative memory in a transmission device that performs routing using the associative memory.

Figure 1:
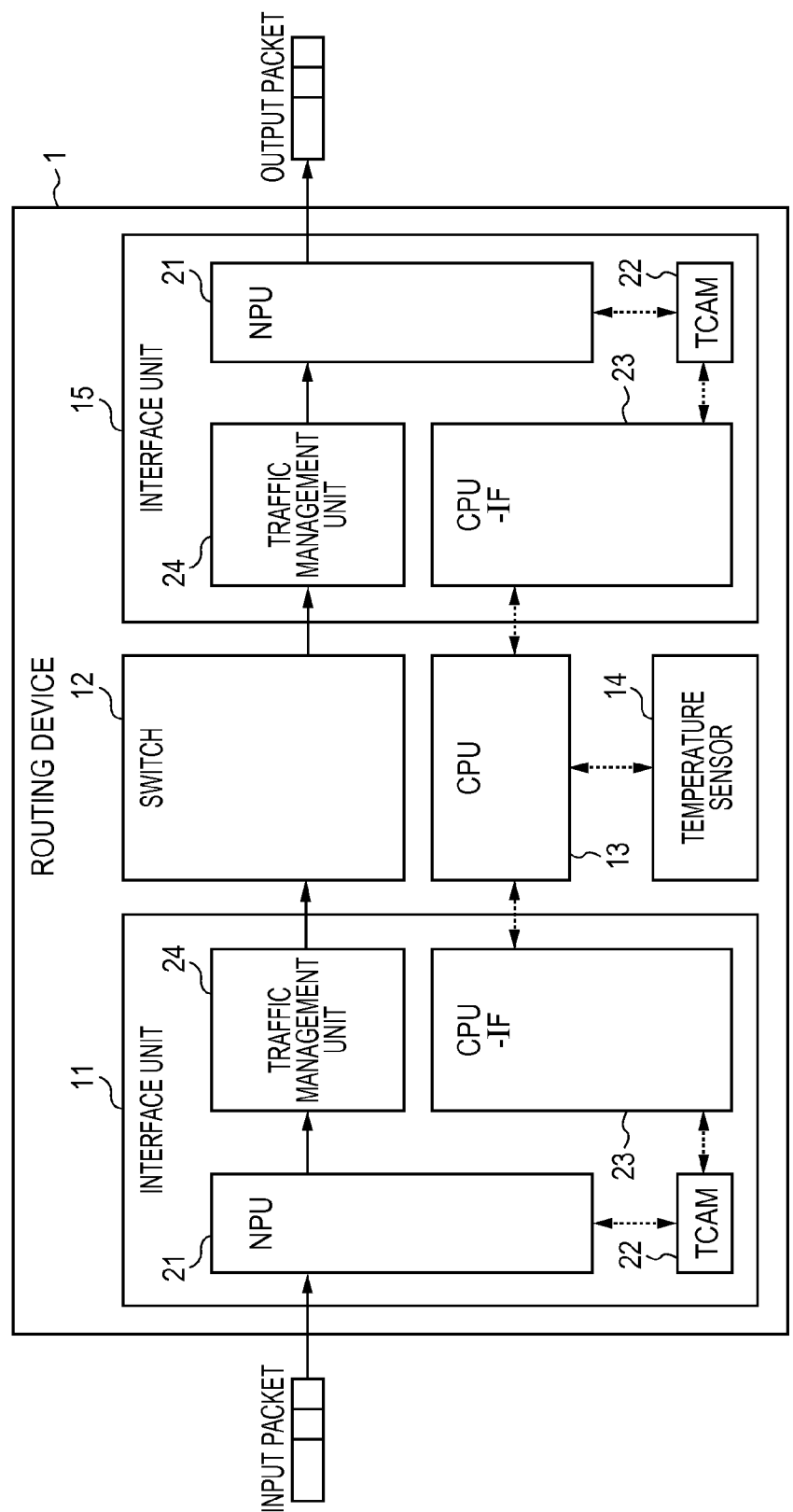
FIG. 1 is a diagram illustrating a configuration of a routing device according to an embodiment.

FIG. 1 is a diagram illustrating a configuration of a routing device 1 according to an embodiment. The routing device 1 is provided on a network and controls a route of a packet. In the embodiments, a packet, a frame, a data unit, etc. are collectively referred to as a "packet". That is, hereinafter, "packet" includes a frame and a data unit. In this case, "frame" includes, for example, a MAC frame or an Ethernet (registered trademark) frame.

The routing device 1 is realized, for example, by a router or a switch. In addition, the routing device 1 is an example of a transmission device. As illustrated in FIG. 1, the routing device 1 includes an interface unit 11 on the input side, a switch 12, a central processing unit (CPU) 13, a temperature sensor 14, and an interface unit 15 on the output side. In addition, the routing device 1 includes the plurality of the interface units 11 and the plurality of the interface units 15 that are not illustrated. In FIG. 1, the arrow of the solid line indicates a flow of a packet data signal, and the arrow of the broken line indicates a flow of a control signal.

The interface unit 11 includes a plurality of input ports that are not illustrated. That is, the interface unit 11 includes an Ingress interface. In addition, the interface unit 11 terminates a packet that is received through each of the input ports. The interface unit 11 includes a network processing unit (NPU) 21, a ternary CAM (TCAM) 22, a CPU interface 23, and a traffic management unit 24.

The NPU 21 analyzes an input packet and identifies an output port. In addition, the NPU 21 may perform grant, update, and deletion of tag information. In addition, the NPU 21 may also perform grant, update, and deletion of a dedicated header that is used in routing information 1. The NPU 21 processes the input packet with reference to the TCAM 22 as appropriate.

The TCAM 22 stores information that is used to control the communication (for example, information that is used to control a route of the input packet). In addition, the TCAM 22 may store another piece of information that is used to process the input packet. In the TCAM 22, a memory address is obtained on the basis of data that is extracted from a header or a payload of the input packet, and desired information is obtained from the memory address.

In the embodiment, the associative memory is one of functional memories and includes a function that searches the memory for data in addition to a common memory function. In a common memory such as a random access memory (RAM), when an address is specified, data that is stored in the specified address is read out. On the other hand, in the associative memory, when a data word is specified, the whole contents of the memory are searched for the data word, and an address of the location in which the word has been found is read out.

The associative memories are classified into two types of "match full search architecture" and "minimum distance search architecture" depending on a search method. The associative memory of "match full search architecture" is called a CAM, and searches for reference data that exactly matches the input data. On the other hand, the associative memory of "minimum distance search architecture" is called a TCAM, and searches for reference data that is most similar to the input data.

In the CAM, for example, route information of a layer 2 and route information of a layer 3 are stored. In addition, to the CAM, control data that is extracted from the header of the input packet (for example, destination address) is granted. After that, the CAM is searched using the granted control data, and the corresponding route information (for example, a port number to identify an output port) is obtained. The routing device outputs a packet in accordance with the route information that is obtained from the CAM as described above.

On the other hand, in the TCAM, as each bit, a mask bit "x (Don't Care)" may be used in addition to "0" and "1". In addition, a routing table is built by setting the mask bit appropriately, thereby realizing high-speed table search.

The CPU interface 23 provides an interface between the NPU 21 and the CPU 13. In addition, the CPU interface 23 also provides an interface between the TCAM 22 and the CPU 13.

The traffic management unit 24 manages traffic that passes through the routing device 1. Here, the traffic management unit 24 may manage traffic, for example, for each subscriber or each flow. For example, when a communication rate of one subscriber exceeds a subscription rate, the traffic management unit 24 discards a packet that corresponds to the exceeded portion.

The switch 12 guides an input packet that is input through the interface unit 11 to the corresponding interface unit 15 in accordance with the routing information. Here, the routing information is granted, for example, to each packet in the NPU 21.

The CPU 13 manages and controls an operation of the routing device 1. In addition, the CPU 13 may execute processing to estimate a temperature of the TCAM 22, processing to predict a temperature change of the TCAM 22, and processing that is related to access restriction to the TCAM 22 (the detail of the CPU 13 is described later).

The temperature sensor 14 measures an ambient temperature of the routing device 1. Alternatively, the temperature sensor 14 may measure a temperature in a shelf that houses the routing device 1. In addition, the temperature that is measured by the temperature sensor 14 is notified to the CPU 13. In this case, the CPU 13 may refer to the temperature that is measured by the temperature sensor 14 when the temperature of the TCAM 22 is estimated.

Similar to the interface unit 11, the interface unit 15 includes the NPU 21, the TCAM 22, the CPU interface 23, and the traffic management unit 24. In addition, the interface unit 15 includes a plurality of output ports that are not illustrated. That is, the interface unit 11 includes an Egress interface. In addition, the interface unit 15 outputs the packet that is guided from the switch 12, to the network through a specified port.

Figure 2:
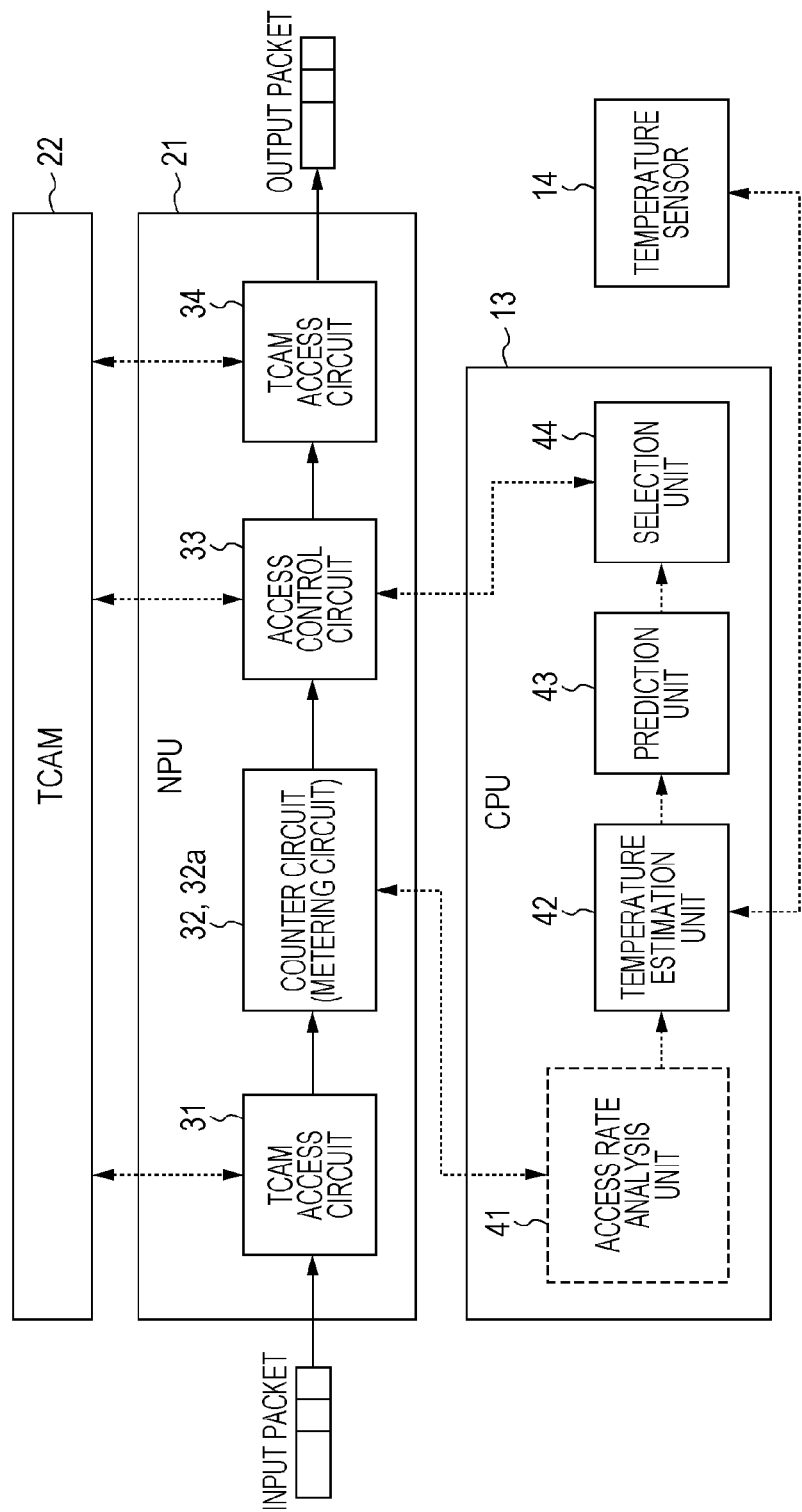
FIG. 2 is a diagram illustrating a function that realizes temperature control of a TCAM.

FIG. 2 is a diagram illustrating a function to realize temperature control of the TCAM 22. In the embodiment, the temperature control of the TCAM 22 is executed in the interface unit 11 that is provided on the Ingress side and the interface unit 15 that is provided on the Egress side. Here, the temperature control operations that are executed in the interface units 11 and 15 are substantially the same. That is, the function and configuration that are described with reference to FIG. 2 may be applied to the interface units 11 and 15. In addition, the temperature control operation of the TCAM 22 may not be executed in both of the interface units 11 and 15.

In the temperature control of the TCAM 22 that is provided in the interface unit 11, an input packet corresponds to a packet that the routing device 1 receives from the network, and an output packet corresponds to a packet that goes from the interface unit 11 to the switch 12. In addition, in the temperature control of the TCAM 22 that is provided in the interface unit 15, an input packet corresponds to a packet that goes from the switch 12 to the interface unit 15, and an output packet corresponds to a packet that the routing device 1 outputs to the network. In FIG. 2, the arrow of the solid line indicates a flow of a packet data signal, and the arrow of the broken line indicates a flow of a control signal.

The NPU 21 includes a TCAM access circuit 31, a counter circuit 32, an access control circuit 33, and a TCAM access circuit 34. The TCAM access circuit 31, the counter circuit 32, the access control circuit 33, the TCAM access circuit 34 are realized, for example, by combination of a hardware circuit and a software program. In this case, the NPU 21 includes a processor that executes the software program.

The TCAM access circuit 31 accesses the TCAM 22 using certain data that is stored in the header of the input packet. At that time, the TCAM access circuit 31 searches the TCAM 22, for example, using a MAC address of the input packet (transmission source MAC address and/or transmission destination MAC address) or a part of the MAC address of the input packet. Alternatively, the TCAM access circuit 31 may search the TCAM 22 using another piece of data that is stored in the header of the input packet. In addition, the TCAM access circuit 31 may search the TCAM 22 using data in the payload of the input packet.

It is assumed that the TCAM access circuit 31 may identify a processing that is requested for the input packet by such search. In this case, the TCAM access circuit 31 may identify whether or not the search by the TCAM access circuit 34 is performed for the input packet. In addition, when the search by the TCAM access circuit 34 is performed for the input packet, the TCAM access circuit 31 may identify the number of accesses from the TCAM access circuit 34 to the TCAM 22.

The counter circuit 32 counts the number of accesses to the TCAM 22 for each input packet. At that time, the counter circuit 32 calculates the sum of the number of accesses from the TCAM access circuit 31 to the TCAM 22 and the number of accesses from the TCAM access circuit 34 to the TCAM 22, for each of the input packets. The number of accesses from the TCAM access circuit 31 to the TCAM 22 for each of the input packets is "1". In addition, the number of accesses from the TCAM access circuit 34 to the TCAM 22 for each of the input packets is identified by the TCAM access circuit 31.

Figure 3:
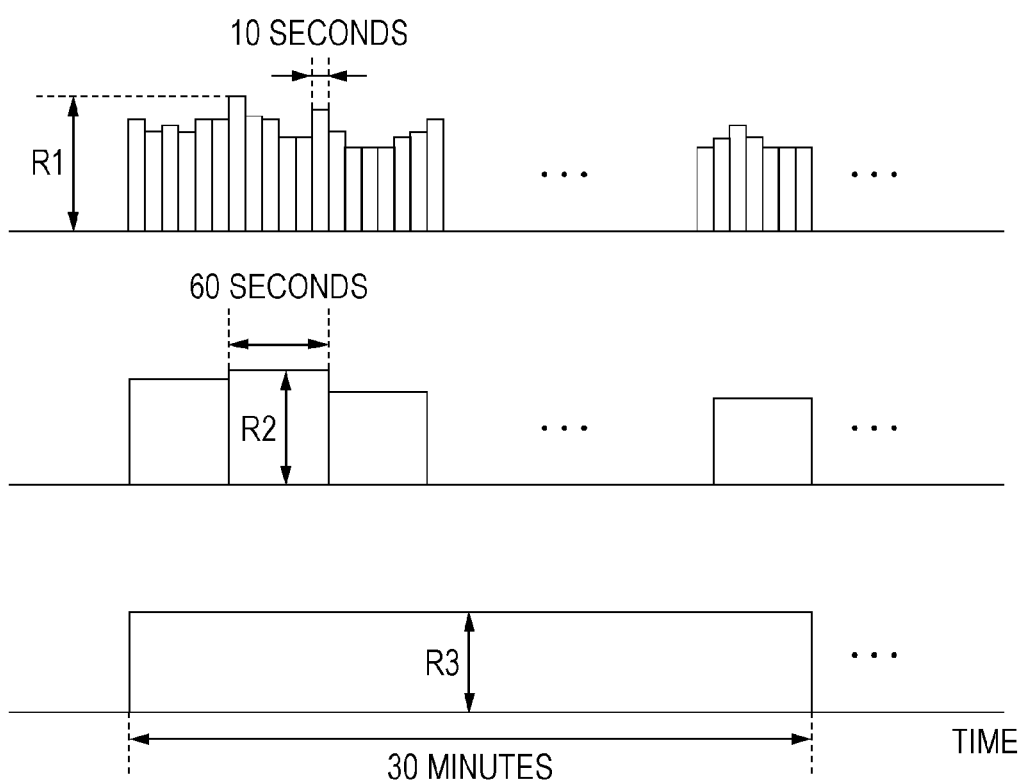
FIG. 3 is a diagram illustrating an example of calculation of an access rate.

The NPU 21 may include a metering circuit 32a instead of the counter circuit 32. The metering circuit 32a calculates an access rate to the TCAM 22. For each of the input packets, the number of accesses to the TCAM 22 is detected, and the access rate to the TCAM 22 is calculated on the basis of the sum. At that time, the metering circuit 32a calculates an average access rate to the TCAM 22 at a certain interval. For example, as illustrated in FIG. 3, the metering circuit 32a calculates the average access rate to the TCAM 22 for every 10 seconds, every 60 seconds, and every 30 minutes. In FIG. 3, the vertical axis indicates an access rate to the TCAM 22.

The access control circuit 33 controls an access to the TCAM 22 in response to an instruction from the CPU 13. A method of restricting an access to the TCAM 22 is described in detail later.

Similar to the TCAM access circuit 31, the TCAM access circuit 34 accesses the TCAM 22 using certain data that is stored in the header of the input packet. At that time, the TCAM access circuit 34 may search the TCAM 22 using the search result by the TCAM access circuit 31. The TCAM access circuit 34 searches the TCAM 22, for example, using a MAC address of the input packet (transmission source MAC address and/or transmission destination MAC address) or a part of the MAC address of the input packet. Alternatively, the TCAM access circuit 34 may search the TCAM 22 using another piece of data that is stored in the header of the input packet. In addition, the TCAM access circuit 34 may search the TCAM 22 using data in the payload of the input packet.

Here, data that is used to search the TCAM 22 by the TCAM access circuit 31 and data that is used to search the TCAM 22 by the TCAM access circuit 34 are mutually different (including a case in which mask bits are mutually different). Alternatively, the TCAM access circuits 31 and 34 may be configured so as to search mutually different blocks in the TCAM 22. In addition, the TCAM access circuits 31 and 34 may be configured so as to search mutually different entries in the TCAM 22.

The TCAM access circuit 34 obtains, for example, at least one piece of information, out of the following five pieces of information, from the TCAM 22, for each input packet.

(1) Information of an output interface unit to which the input packet is to be transferred
(2) Information of an output port to which the input packet is to be transferred
(3) Information to identify a flow to which the input packet belongs
(4) Information of a band of the flow to which the input packet belongs
(5) Information of a priority level of the input packet As described above, the routing device 1 process the input packet on the basis of the information that is obtained from the TCAM 22. For example, the switch 12 may guide the input packet to a specified interface unit 15, in accordance with "output interface unit to which the input packet is to be transferred". The interface unit 15 may guide the input packet to a specified output port in accordance with "output port to which the input packet is to be transferred". The traffic management unit 24 may discard the input packet in accordance with "band of a flow to which the input packet belongs" or "priority level of the input packet".

The CPU 13 includes an access rate analysis unit 41, a temperature estimation unit 42, a prediction unit 43, and a selection unit 44. The CPU 13 realizes functions of the access rate analysis unit 41, the temperature estimation unit 42, the prediction unit 43, and the selection unit 44 that are described below by executing a software program.

The access rate analysis unit 41 calculates an access rate to the TCAM 22 on the basis of the number of accesses to the TCAM 22, which is obtained by the counter circuit 32 for each input packet. The access rate to the TCAM 22 is calculated on the basis of the total number of accesses to the TCAM 22. At that time, the access rate analysis unit 41 calculates an average access rate to the TCAM 22 at a certain interval. For example, as illustrated in FIG. 3, the access rate analysis unit 41 calculates the access rate to the TCAM 22 for every 10 seconds, every 60 seconds, and every 30 minutes. However, when the NPU 21 includes the metering circuit 32a, the CPU 13 may not include the access rate analysis unit 41.

As described above, the counter circuit 32 and the access rate analysis unit 41 are examples of a detector that detects an access rate to the associative memory (that is, the TCAM 22 in the embodiment). In addition, the metering circuit 32a is another example of the detector that detects an access rate to the associative memory.

The temperature estimation unit 42 estimates a temperature of the TCAM 22 on the basis of the access rate to the TCAM 22. At that time, the temperature estimation unit 42 may estimate the temperature of the TCAM 22 on the basis of the access rate to the TCAM 22 and the temperature that is measured by the temperature sensor 14.

When a temperature sensor is provided in the vicinity of the TCAM 22, the temperature of the TCAM 22 may be measured. However, in order to provide the temperature sensor in the vicinity of the TCAM 22, it is desirable that a board on which the TCAM 22 is mounted and the surrounding structure are changed. Therefore, it is difficult to provide the temperature sensor in the vicinity of the TCAM 22 without changing the structural design of the routing device 1. That is, it is difficult to measure the temperature of the TCAM 22 directly. Thus, in the routing device 1 according to the embodiment, the temperature of the TCAM 22 is estimated on the basis of the access rate to the TCAM 22. By such a method, the temperature of the TCAM 22 may be estimated without changing the structural design of the routing device 1.

The prediction unit 43 predicts a time period until the temperature of the TCAM 22 reaches a specified threshold temperature, on the basis of the estimation temperature of the TCAM 22, which is obtained by the temperature estimation unit 42. The threshold temperature is specified, for example, by a network administrator or a user.

The selection unit 44 selects a method of restricting an access to the TCAM 22. In addition, the selection unit 44 issues an instruction to the access control circuit 33 so that the selected method is executed. The access control circuit 33 restricts an access to the TCAM 22 in response to the instruction from the selection unit 44.

In the example illustrated in FIG. 2, the functions of the temperature estimation unit 42, the prediction unit 43, and the selection unit 44 are realized by the CPU 13, and the embodiments are not limited by such a configuration. That is, the functions of the temperature estimation unit 42, the prediction unit 43, and the selection unit 44 may be realized, for example, by processors that are provided in the interface units 11 and 15.

Figure 4:
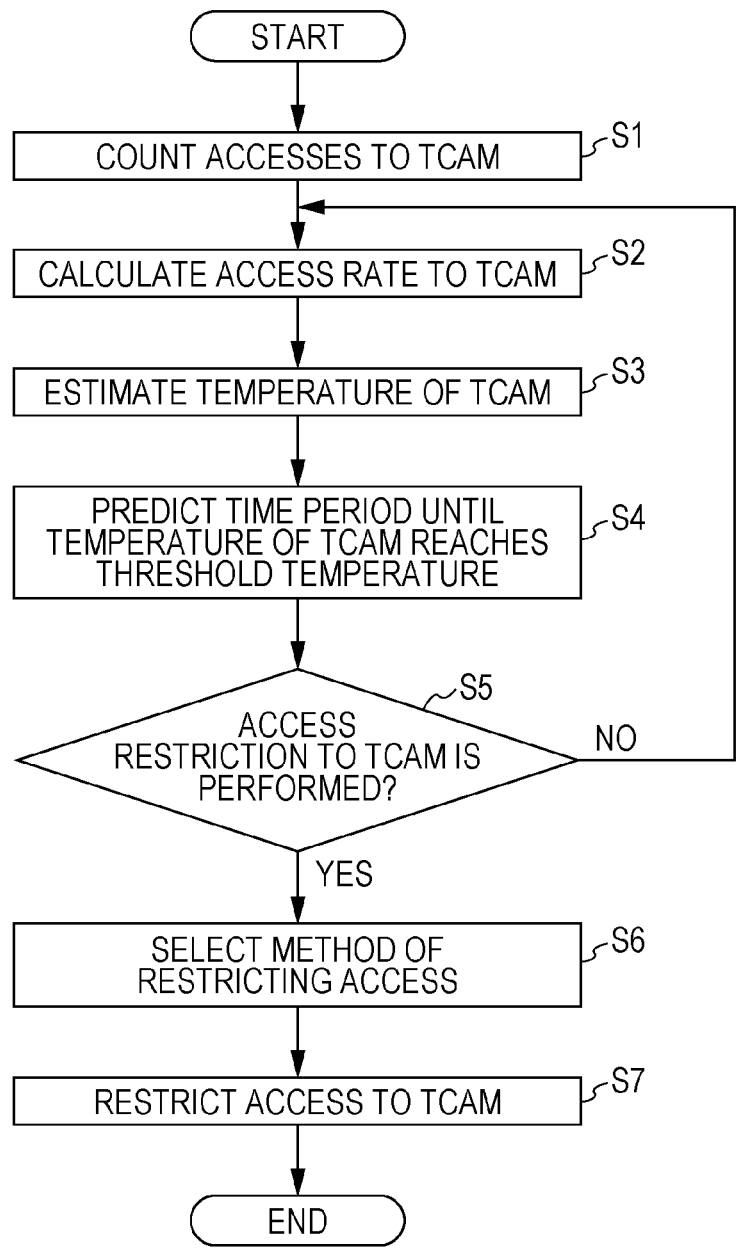
FIG. 4 is a flowchart illustrating a method of restricting an access to the TCAM.

FIG. 4 is a flowchart illustrating the method of restricting an access to the TCAM 22. The processing of the flowchart is executed by the NPU 21 and the CPU 13. In Operation S1, the counter circuit 32 counts accesses to the TCAM 22. It is assumed that the counter circuit 32 monitors the access to the TCAM 22 at all times. In Operation S2, the access rate analysis unit 41 calculates an access rate to the TCAM 22. In a case in which the metering circuit 32a is used instead of the counter circuit 32, in Operations S1 and S2, the metering circuit 32a calculates the access rate to the TCAM 22.

In Operation S3, the temperature estimation unit 42 estimates the temperature of the TCAM 22 on the basis of the access rate to the TCAM 22. In Operation S4, the prediction unit 43 predicts a time period until the temperature of the TCAM 22 reaches the specified threshold temperature using the estimation temperature of the TCAM 22, which is obtained by the temperature estimation unit 42, as a reference.

In Operation S5, the prediction unit 43 determines whether or not the access restriction to the TCAM 22 is performed on the basis of the prediction time period until the temperature of the TCAM 22 reaches the specified threshold temperature. For example, when the prediction time period is shorter than a threshold time period that is specified beforehand, the prediction unit 43 determines that the access restriction to the TCAM 22 is performed.

When the access restriction to the TCAM 22 is performed, in Operation S6, the selection unit 44 selects a method of restricting an access to the TCAM 22. At that time, the selection unit 44 may select a method that corresponds to the above-described threshold temperature, for example, from a plurality of methods of restricting an access to the TCAM 22, which are set beforehand. When the access restriction to the TCAM 22 is not performed, the processing of the flowchart returns to Operation S2.

In Operation S7, the access control circuit 33 restricts an access to the TCAM 22 using the method that is selected by the selection unit 44. When the access to the TCAM 22 is restricted, the power consumption of the TCAM is reduced, so that the temperature of the TCAM 22 is also reduced.

A method of estimating the temperature of the TCAM 22 on the basis of the access rate to the TCAM 22 is described below. The temperature of the TCAM 22 mainly depends on an access rate to the TCAM 22. That is, the temperature of the TCAM 22 increases when the access rate to the TCAM 22 is high, and the temperature of the TCAM 22 is reduced when the access rate to the TCAM 22 is low.

Figure 5:
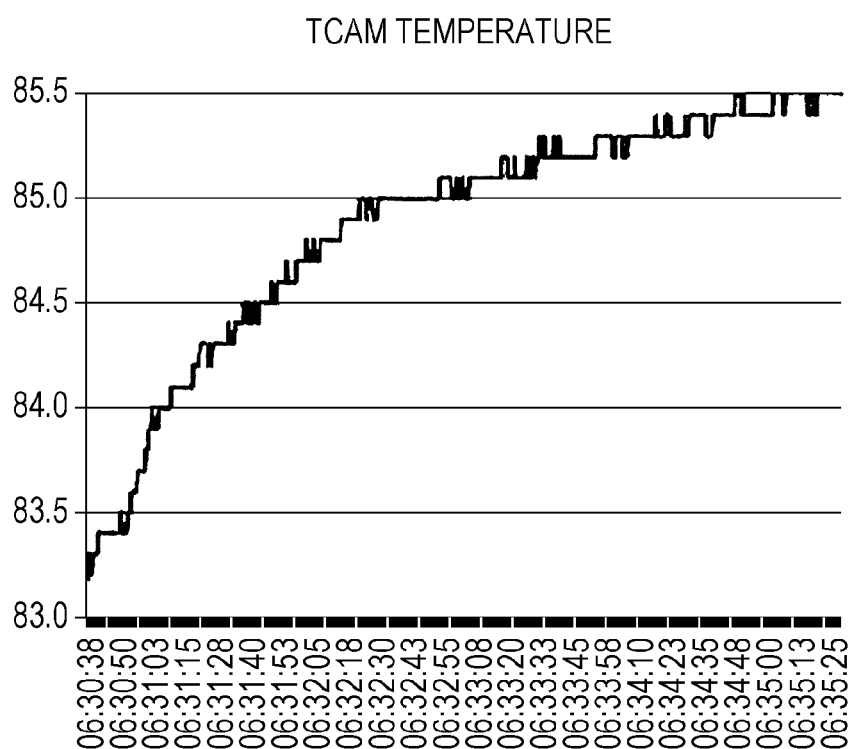
FIG. 5 is a diagram illustrating measurement data of a temperature of the TCAM.

FIG. 5 is a diagram illustrating a temperature of the TCAM 22 when an access rate to the TCAM 22 is gradually increased. The temperature of the TCAM 22 is measured by the temperature sensor that is provided in the vicinity of the TCAM 22. As described above, when the access rate to the TCAM 22 increases, the temperature of the TCAM 22 also increases.

However, it is known that the temperature of the TCAM 22 may be accurately estimated on the basis of an average access rate to the TCAM 22 when the length of a monitor time period during which the average access rate to the TCAM 22 is detected is set appropriately. In the embodiment, it is assumed that the temperature of the TCAM 22 is accurately estimated on the basis of the average access rate to the TCAM 22 that is obtained by monitoring during 30 minutes.

FIG. 6 is a diagram illustrating a relationship of an average access rate to the TCAM 22 and an estimation temperature of the TCAM 22. In this example, for example, when the average access rate during 30 minutes is 10 million times (mega times)/sec, the estimation temperature of the TCAM 22 is 75° C. Thus, when the average access rate that is obtained during the monitor time period of 30 minutes is 10 mega times/sec, the temperature estimation unit 42 estimates that the temperature of the TCAM 22 is 75° C. at the end of the monitor time period.

The temperature estimation unit 42 may calculate the estimation temperature of the TCAM 22 on the basis of the average access rate to the TCAM 22, using a function that is obtained on the basis of the measurement or simulation. In addition, the temperature estimation unit 42 may correct the estimation temperature on the basis of the average access rate to the TCAM 22 using the temperature that is measured by the temperature sensor 14.

The prediction operation by the prediction unit 43 is described below. The prediction unit 43 predicts a temperature change of the TCAM 22 on the basis of the current temperature of the TCAM 22 and the access rate to the TCAM 22.

As described above, the temperature of the TCAM 22 depends on the access rate to the TCAM 22. In addition, in the embodiment, it is assumed that the temperature change of the TCAM 22 may be calculated on the basis of the access rate to the TCAM 22. In this case, the prediction unit 43 uses a function that is used to obtain the temperature change of the TCAM 22 from the access rate to the TCAM 22. Such a function is generated, for example, on the basis of the measurement or the simulation. In addition, when the temperature change of the TCAM 22 is obtained using such a function, the current temperature of the TCAM 22 is used as an initial value.

Figure 7:
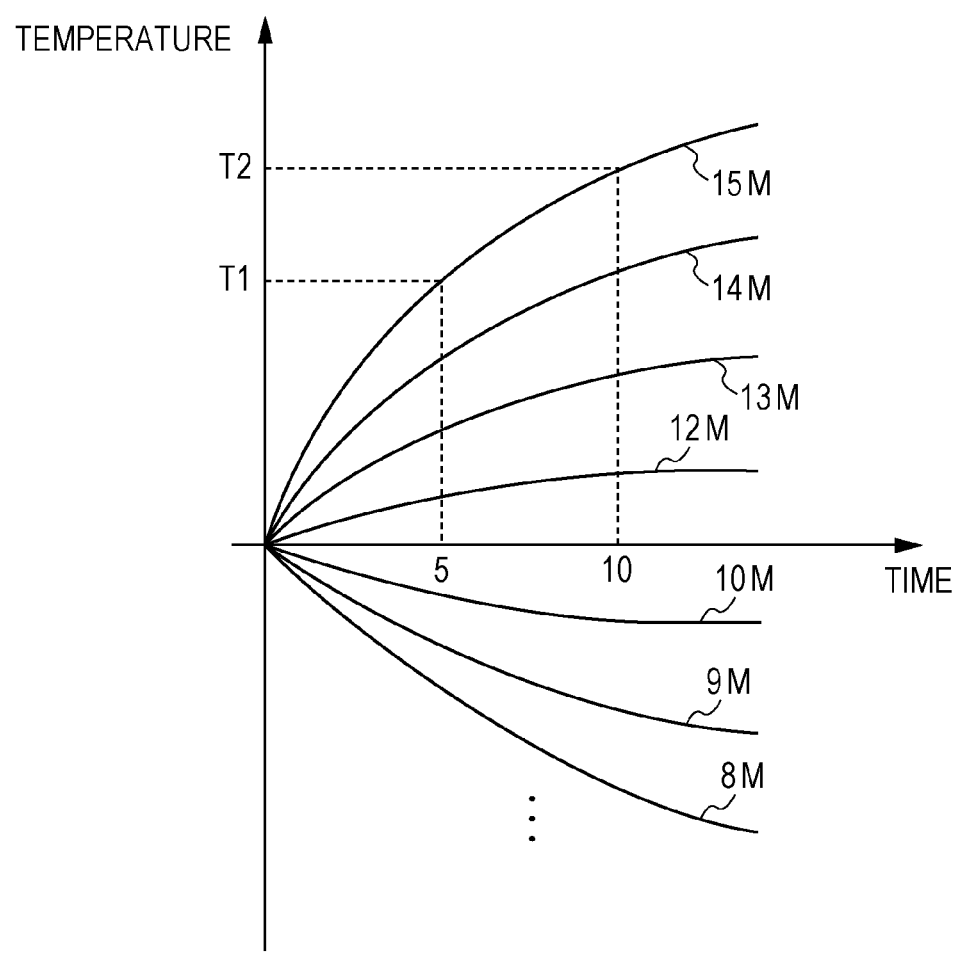
FIG. 7 is a diagram illustrating a function that is used to obtain a temperature change in the TCAM from the access rate.

FIG. 7 is a diagram illustrating the function that is used to obtain a temperature change of the TCAM 22 from the access rate to the TCAM 22. By such a function, when the current temperature of the TCAM 22 and the access rate to the TCAM 22 are used, the temperature change of the TCAM 22 is obtained. For example, it is assumed that a state is continued in which the current temperature of the TCAM 22 is Tc, and the access rate to the TCAM 22 is 15 mega times/sec. In this case, as illustrated in FIG. 7, the temperature of the TCAM 22 becomes T1 five minutes later, and becomes T2 10 minutes later.

As described above, the prediction unit 43 may calculate the temperature change of the TCAM 22 when "current temperature of the TCAM 22" and "access rate to the TCAM 22" are used. Here, the prediction unit 43 uses an estimation temperature of the TCAM 22, which is obtained by the temperature estimation unit 42 as "current temperature of the TCAM 22". In addition, as "access rate to the TCAM 22", for example, the maximum access rate that is assumed by the routing device 1 is used. It is assumed that the maximum access rate that is assumed by the routing device 1 is identified beforehand. In addition, the prediction unit 43 may use the maximum access rate that is detected in a certain previous time period as "access rate to the TCAM 22". In this case, pieces of data of the average access rate, which are obtained by the access rate analysis unit 41 (or the metering circuit 32a) for every 10 seconds and/or 60 seconds are held in the time series. In addition, the prediction unit 43 obtains the highest average access rate in a certain time period (for example, 30 minutes) as "access rate to the TCAM 22". For example, in the example illustrated in FIG. 3, when the average access rate is detected for every 10 seconds, the temperature change of the TCAM 22 is obtained using "access rate to the TCAM 22=R1". In addition, in the example illustrated in FIG. 3, when the average access rate is detected for every 60 seconds, the temperature change of the TCAM 22 is obtained using "access rate to the TCAM 22=R2".

In addition, the prediction unit 43 predicts a time period until the temperature of the TCAM 22 reaches the specified threshold temperature, using the temperature change of the TCAM 22, which is obtained as described above. Such a threshold temperature is used, for example, to determine whether or not the access control circuit 33 performs the access restriction to the TCAM 22.

Figure 8:
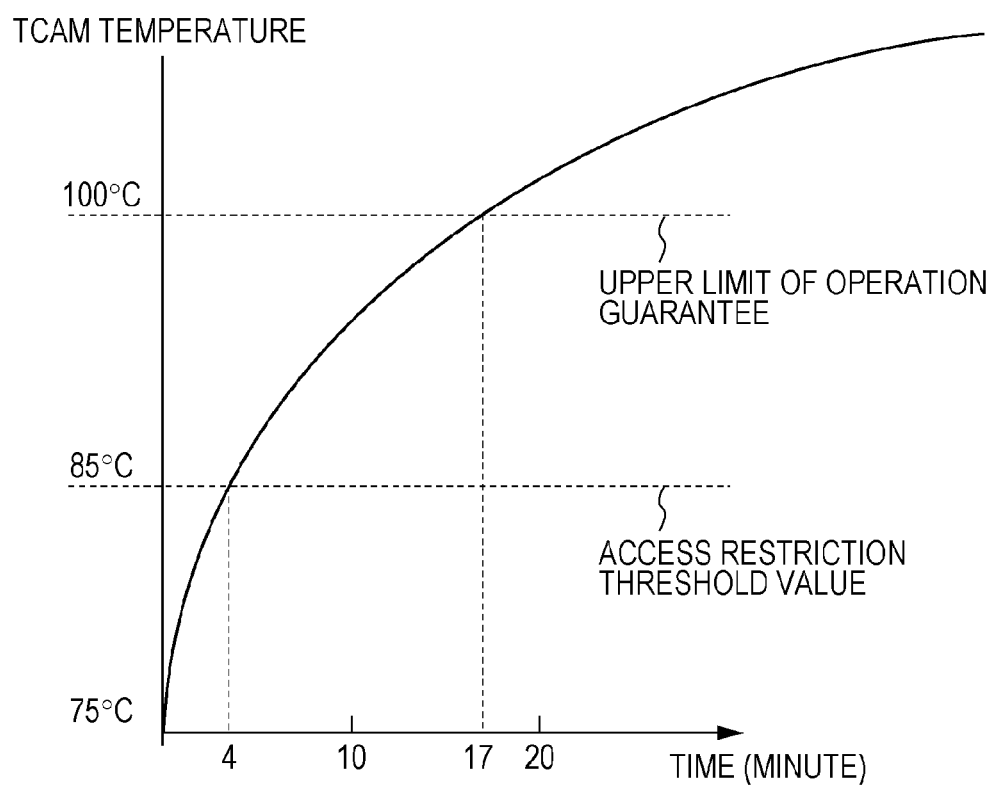
FIG. 8 is a diagram illustrating an operation of a prediction unit.

FIG. 8 is a diagram illustrating an operation of the prediction unit 43. In the example illustrated in FIG. 8, the average access rate to the TCAM 22 during the previous time period of 30 minutes is 10 mega times/sec, and "current temperature of the TCAM 22=75° C." is obtained on the basis of the correspondence relationship illustrated in FIG. 6. In addition, as the assumed maximum access rate, "15 mega times/sec" is used. In addition, the following two threshold temperatures are set. An access restriction threshold value, which is 85° C. in the example, is used to determine whether or not the access restriction to the TCAM 22 is performed. In addition, an upper limit of operation guarantee, which is 100° C. in the example, indicates the maximum temperature at which the operation of the TCAM 22 is guaranteed.

In this case, the prediction unit 43 predicts that the time period until the temperature of the TCAM 22 reaches the access restriction threshold value is "four minutes". In addition, the prediction unit 43 predicts that the time period until the temperature of the TCAM 22 reaches the upper limit of the operation guarantee is "17 minutes".

Figure 9:
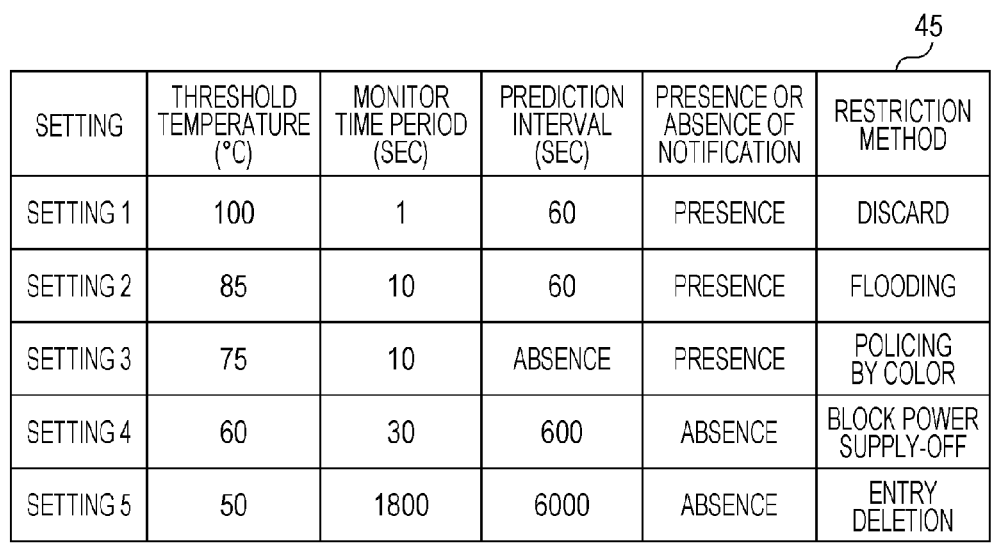
FIG. 9 is a diagram illustrating an example of an access restriction management table.

FIG. 9 is a diagram illustrating an example of an access restriction management table 45. The access restriction management table 45 is referred to by the prediction unit 43 and the selection unit 44. That is, the prediction unit 43 predicts a time period until the temperature of the TCAM 22 reaches the threshold value with reference to the access restriction management table 45. In addition, the selection unit 44 selects a method of restricting an access to the TCAM 22 with reference to the access restriction management table 45.

The access restriction management table 45 stores information that defines five operation modes (setting 1 to setting 5) in the example illustrated in FIG. 9. In addition, the access restriction management table 45 stores information that indicates "threshold temperature", "monitor time period", "prediction interval", "presence or absence of notification", and "restriction method" for each of the operation modes.

"Threshold temperature" is used to determine whether or not the access restriction to the TCAM 22 is executed. For example, in the setting 2, "threshold temperature" is 85° C. In this case, the prediction unit 43 predicts a time period until the temperature of the TCAM 22 reaches 85° C. In addition, the access control circuit 33 executes the access restriction to the TCAM 22 when the prediction time period that is obtained by the prediction unit 43 has elapsed.

"Monitor time period" is used to define a monitor time period during which an average access rate is detected. For example, in the setting 2, "monitor time period" is 10 seconds. In this case, the prediction unit 43 holds data of the average access rate that is obtained for every 10 seconds in the time series. In addition, the prediction unit 43 predicts the temperature change of the TCAM 22 using the highest average access rate in the certain previous time period (for example, 30 minutes) as "access rate to the TCAM 22". When "monitor time period" is 10 seconds, in the example illustrated in FIG. 3, the prediction unit 43 predicts the temperature change of the TCAM 22 using "access rate to the TCAM 22=R1".

"Prediction interval" indicates an interval at which the prediction unit 43 performs the prediction. For example, in the setting 2, "prediction interval" is 60 seconds. In this case, the prediction unit 43 predicts the temperature change of the TCAM 22 for every 60 seconds. "Presence or absence of notification" indicates whether or not the prediction result by the prediction unit 43 is notified to the user. "Restriction method" indicates a restriction method that is executed by the access control circuit 33.

At least one of the operation modes that are defined in the access restriction management table 45 is activated. For example, FIG. 8 illustrates a state in which the two operation modes (setting 1 and setting 2) are activated.

Operations of the prediction unit 43 and the selection unit 44 are described below. Here, it is assumed that the setting 2 illustrated in FIG. 9 is activated. That is, "threshold temperature=85° C." is set to the prediction unit 43. The prediction unit 43 predicts a temperature change of the TCAM 22 for every 10 minutes when the temperature of the TCAM 22 is sufficiently low for the threshold temperature. At that time, the prediction unit 43 predicts the temperature change of the TCAM 22 using the maximum value of the average access rate that is detected for every 60 seconds. In addition, "threshold time period=five minutes" is set to the prediction unit 43. In addition, the prediction unit 43 predicts a time period until the temperature of the TCAM 22 reaches "threshold temperature".

When the access rate to the TCAM 22 is low, the power consumption of the TCAM 22 is small, and the temperature of the TCAM 22 is low. In this case, the estimation temperature of the TCAM 22, which is obtained by the temperature estimation unit 42 is also low. In addition, in the prediction unit 43, the prediction time period until the temperature of the TCAM 22 reaches "threshold temperature" is longer than "threshold time period". Alternately, the prediction unit 43 may predict that the temperature of the TCAM 22 does not reach "threshold temperature".

When the access rate to the TCAM 22 becomes high, the power consumption of the TCAM 22 becomes large, and the temperature of the TCAM 22 increases. In this case, the estimation temperature of the TCAM 22, which is obtained by the temperature estimation unit 42 also increases. As illustrated in FIG. 8, it is assumed that the prediction unit 43 predicts that the time period until the temperature of the TCAM 22 reaches "threshold temperature=85° C." is "four minutes". The prediction time period is shorter than "threshold time period=five minutes" that is described above.

When the prediction time period is shorter than the threshold time period, the prediction unit 43 outputs an alarm. In the above-described example, the prediction unit 43 outputs the message that indicates "it is predicted that the temperature of the TCAM 22 reaches 85° C. four minutes later". Such a message is displayed, for example, on a display device that is connected to the routing device 1. The prediction unit 43 may display the prediction time period on the display device regardless whether or not the prediction time period until the temperature of the TCAM 22 reaches threshold temperature is shorter the threshold value time.

The selection unit 44 issues a restriction instruction to the access control circuit 33 when the prediction time period that is obtained by the prediction unit 43 has elapsed. In the above-described example, the prediction unit 43 predicts that the time period until the temperature of the TCAM 22 reaches 85° C. is "four minutes". In this case, the selection unit 44 issues an instruction of "setting 2: flooding" to the access control circuit 33 at the time at which four minutes has elapsed after the prediction. The selection unit 44 may issue the restriction instruction to the access control circuit 33 merely when the prediction time period by the prediction unit 43 is shorter than the threshold time period.

Figure 10:
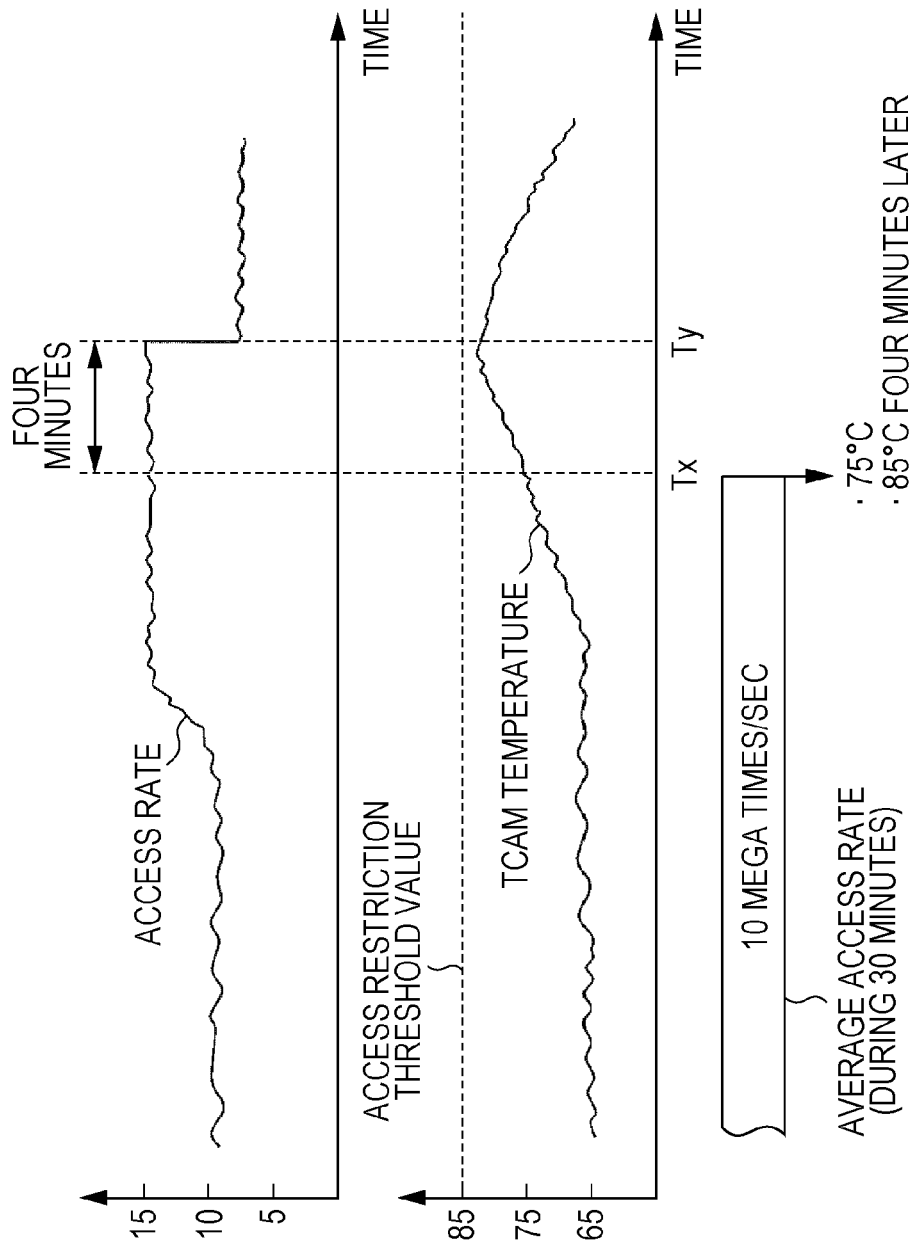
FIG. 10 is a diagram illustrating temperature control by the access restriction.

FIG. 10 is a diagram illustrating temperature control by the access restriction. In the example illustrated in FIG. 10, the temperature estimation unit 42 estimates the temperature of the TCAM 22 at a time Tx. Here, the average access rate to the TCAM 22 during the previous time period of 30 minutes before the time Tx is 10 mega times/sec that is detected by the access rate analysis unit 41 (or the metering circuit 32a). Therefore, the temperature estimation unit 42 estimates that the temperature of the TCAM 22 at the time Tx is 75° C., on the basis of the correspondence relationship illustrated in FIG. 6.

The prediction unit 43 predicts a time period until the temperature of the TCAM 22 reaches the access restriction threshold value by adding "temperature change that corresponds to the maximum value of the access rate to the TCAM 22" to "the temperature of the TCAM 22=75° C.". It is assumed that "maximum value of the access rate to the TCAM 22" is detected by the access rate analysis unit 41 (or the metering circuit 32a). In addition, the access restriction threshold value is 85° C. In addition, the prediction unit 43 obtains "prediction time period until the temperature of the TCAM 22 reaches the access restriction threshold value=four minutes".

In this case, the access control circuit 33 starts the access restriction to the TCAM 22 when four minutes has elapsed after the time Tx. Therefore, after a time Ty, the access rate to the TCAM 22 is reduced, and the temperature of the TCAM 22 is reduced.

Here, the access rate to the TCAM 22 may greatly vary due to various factors. Therefore, for example, even in a case in which the prediction unit 43 predicts that "the temperature of the TCAM 22 exceeds the threshold temperature four minutes later", when the access rate to the TCAM 22 is reduced just after such prediction, the temperature of the TCAM 22 does not practically increase to the threshold temperature. Alternatively, even in the case in which the prediction unit 43 predicts that "the temperature of the TCAM 22 exceeds the threshold temperature four minutes later", when the access rate to the TCAM 22 sharply increases after such prediction, the temperature of the TCAM 22 may exceeds the threshold temperature before start of the access restriction.

Therefore, in another embodiment that is described later, the prediction unit 43 increases a prediction frequency and/or prediction accuracy after predicting that "the temperature of the TCAM 22 exceeds the threshold temperature". At that time, the prediction unit 43 changes the prediction frequency and/or prediction accuracy on the basis of information that is set in the access restriction management table 45.

In the above-described example, "setting 2" illustrated in FIG. 9 is activated. In addition, it is predicted that the time period until the temperature of the TCAM 22 reaches "threshold temperature=85° C." is shorter than "threshold time period=five minutes". In this case, the prediction unit 43 shortens the prediction frequency from "10 minutes" to "60 seconds". That is, after determining that the prediction time period is shorter than the threshold time period, the prediction unit 43 predicts the temperature change of the TCAM 22 for every 60 seconds.

In addition, the prediction unit 43 uses the maximum value of the average access that is obtained during the shorter detection time period when predicting the temperature change of the TCAM 22. For example, in the setting 2, "monitor time period=10 seconds" is set. Therefore, the prediction unit 43 predicts the temperature change of the TCAM 22 using the maximum value of the access rate that is detected for every 10 seconds, instead of the maximum value of the access rate that is detected for every 60 seconds.

As described above, when it is predicted that the temperature of the TCAM 22 reaches the threshold temperature, the prediction interval by the prediction unit 43 is shortened. Therefore, it may be accurately predicted whether or not the temperature of the TCAM 22 reaches the threshold temperature.

After that, the prediction unit 43 repeatedly performs prediction of the temperature change of the TCAM 22. In addition, when the prediction unit 43 determines that the time period until the temperature of the TCAM 22 reaches the threshold temperature is "zero" or "sufficiently short", the selection unit 44 issues an instruction to the access control circuit 33 on the basis of the setting of the access restriction management table 45. In the example, the selection unit 44 instructs the access control circuit 33 to execute "flooding" that corresponds to the setting 2.

Figure 11:
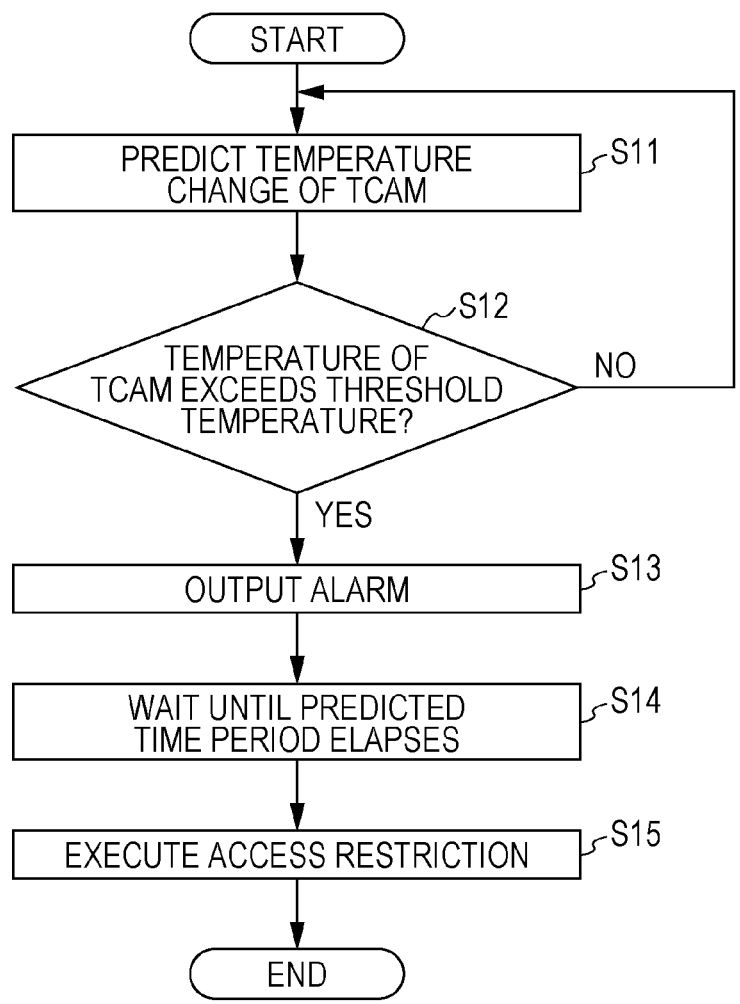
FIG. 11 is a flowchart illustrating an example of processing of the prediction unit and a selection unit.
Figure 12:
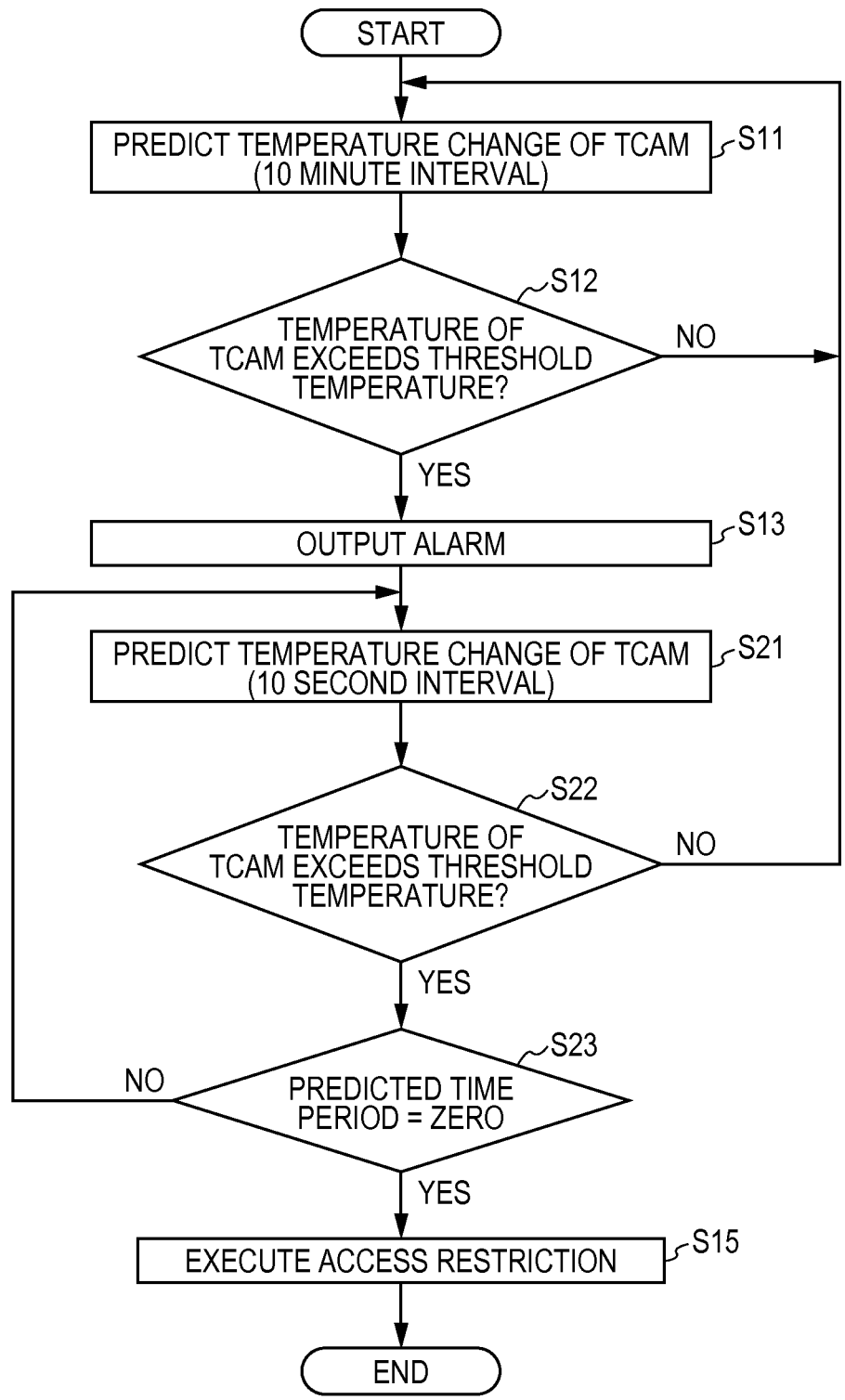
FIG. 12 is a flowchart illustrating another example of the processing of the prediction unit and the selection unit.

FIGS. 11 and 12 are flowcharts illustrating processing of the prediction unit 43 and processing of the selection unit 44. The processing of the flowchart is realized when the CPU 13 executes a software program.

In the example illustrated in FIG. 11, in Operations S11 and S12, the prediction unit 43 predicts the temperature change of the TCAM 22. At that time, the prediction unit 43 predicts the temperature change of the TCAM 22 using the estimation temperature of the TCAM 22, which is obtained by the temperature estimation unit 42 and the maximum access rate that is calculated by the access rate analysis unit 41 (or the metering circuit 32a).

When it is predicted that the temperature of the TCAM 22 does not reaches the threshold temperature (or when the time period until the temperature of the TCAM 22 reaches the threshold temperature is longer than the threshold time period), the processing of the flowchart returns to Operation S11. That is, until it is predicted that the temperature of the TCAM 22 reaches the threshold temperature, the processing of Operations S11 and S12 is executed repeatedly.

When it is predicted that the temperature of the TCAM 22 reaches the threshold temperature (or when the time period until the temperature of the TCAM 22 reaches the threshold temperature is shorter than the threshold time period), the prediction unit 43 outputs an alarm in Operation S13. In addition, the prediction unit 43 notifies the selection unit 44 of the prediction time period until the temperature of the TCAM 22 reaches the threshold temperature.

In Operation S14, the selection unit 44 waits until the prediction time period that is notified by the prediction unit 43 elapses. In addition, after the prediction time period has elapsed, the selection unit 44 issues an instruction of execution of the access restriction to the access control circuit 33 in Operation S15.

Similar to the example illustrated in FIG. 11, in the example illustrated in FIG. 12, the processing in Operations S11 to S13 is executed. However, in the flowchart illustrated in FIG. 12, it is assumed that the processing in Operations S11 and S12 is executed at 10 minute intervals. In addition, in Operation S11 of the flowchart illustrated in FIG. 12, it is assumed that the temperature change of the TCAM 22 is predicted using the maximum value of the average access rate for every 60 seconds (R2 in the example illustrated in FIG. 3).

When it is predicted that the temperature of the TCAM 22 reaches the threshold temperature (Operation S12: Yes), the prediction unit 43 executes the processing in Operations S21 to S23. The processing in Operations S21 to S23 is executed at an interval that is shorter than that of Operations S11 and S12 (for example, for every 10 seconds).

Similar to Operation S11, in Operation S21, the prediction unit 43 predicts the temperature change of the TCAM 22. In Operation S21, the prediction unit 43 predicts the temperature change of the TCAM 22 using the maximum value of the average access rate (R1 in the example illustrated in FIG. 3) during a detection time period that is shorter than that of Operation S11 (for example, 10 seconds). As a result, when it is predicted that the temperature of the TCAM 22 does not reach the threshold temperature (Operation S22: No), the processing of the flowchart returns to Operation S11.

When it is predicted that the temperature of the TCAM 22 reaches the threshold temperature (Operation S21: Yes), the prediction unit 43 predicts a time period until the temperature of the TCAM 22 reaches the threshold temperature in Operation S23. In addition, when the prediction time period is zero or sufficiently short, the selection unit 44 issues an instruction of execution of the access restriction to the access control circuit 33 in Operation S15.

The access control circuit 33 restricts an access to the TCAM 22 when receiving the instruction of Operation S15 illustrated in FIG. 11 or 12. The method of restricting an access is defined in the access restriction management table 45 illustrated in FIG. 9.

When an instruction of "discard" is issued, the access control circuit 33 discards the input packet. In this case, the access to the TCAM 22 by the TCAM access circuit 34 is not performed, so that the power consumption of the TCAM 22 is greatly reduced.

When an instruction of "flooding" is issued, the access control circuit 33 prohibits processing to identify an output port for the input packet with reference to the TCAM 22. In this case, the output port that corresponds to the destination is not identified for the input packet, so that the input packet is flooded to all output ports in the routing device 1.

When an instruction of "policing by color" is issued, the access control circuit 33 performs policing on an input packet having a low priority level. It is assumed that the priority level is identified, for example, by a color (red: Violate, yellow: Exceed, and green: Comfort). In addition, the policing corresponds to processing to discard a packet that exceeds a band that is set beforehand.

When an instruction of "block power supply-off" is issued, the access control circuit 33 terminates supply of electric power to a part of a plurality of memory blocks that constitute the TCAM 22. At that time, the access control circuit 33 terminates supply of electric power, for example, to a memory block having a high access frequency. In this case, the power consumption of the TCAM 22 may be greatly reduced. Alternatively, the access control circuit 33 may terminate supply of electric power to a memory block that stores information having a low priority level. In this case, an access to information having a high priority level is guaranteed. It is assumed that the TCAM 22 includes a plurality of memory blocks, and electric power is supplied to each of the memory blocks.

When an instruction of "entry deletion" is issued, the access control circuit 33 deletes a part of a plurality of entries that are generated in the TCAM 22. At that time, the access control circuit 33 deletes, for example, an entry having a high access frequency. In this case, the power consumption of the TCAM 22 may be greatly reduced. Alternatively, the access control circuit 33 may delete an entry that stores information having a low priority level. In this case, an access to information having a high priority level is guaranteed.

FIGS. 13A and 13B illustrate examples of access restriction. Here, it is assumed that instructions of "policing by color" and "block power supply-off" are issued from the selection unit 44 to the access control circuit 33. In addition, the TCAM 22 includes five memory blocks A to E.

FIG. 13A illustrates the number of accesses to the TCAM 22, which is detected for each of the memory blocks and each of the colors. The number of accesses to the TCAM 22 is detected by the counter circuit 32 (or the metering circuit 32*a*). In the example illustrated in FIG. 13A, for example, 100 accesses are detected for the memory block A during a certain detection time period. All of the accesses to the memory block A are caused by a green packet. In addition, for the memory block B, 2000 accesses that are caused by the green packet are detected, 2000 accesses that are caused by a yellow packet are detected, and 2000 accesses that are caused by a red packet are detected.

In the example illustrated in FIG. 13B, the method of restricting an access is selected from "threshold value of the number of accesses", "upper class of the number of accesses", and "color-specific operation". That is, at least one of "threshold value of the number of accesses", "upper class of the number of accesses", and "color-specific operation" is selected by the selection unit 44.

"Threshold value of the number of accesses" defines the number of accesses of the memory block. In such an example, the threshold value of the number of accesses is 500. For example, the number of accesses to the memory block A is 100, which is smaller than the threshold value of the number of accesses. Therefore, the supply of electric power to the memory access A is continued. On the other hand, the number of accesses to the memory block B is 6000, which is larger than the threshold value of the number of accesses. Therefore, the access control circuit 33 terminates the supply of electric power to the memory access B.

"Upper class of the number of accesses" defines the number of memory blocks to which the electric power supply is terminated. In this case, "2" is specified. Therefore, the access control circuit 33 terminates supply of electric power to the memory block E having the largest number of accesses and the memory block B having the second largest number of accesses.

"Color-specific operation" controls whether or not the policing is applied depending on a priority level of each input packet. In this case, as a threshold value to determine whether or not the policing is applied, 50 is set to the green packet, and zero is set to the yellow packet. However, whether or not the policing is applied is set for each of the memory blocks and each of the colors. For example, for the memory block A, the policing is applied to the green packet, and the policing is not applied to the yellow packet. In addition, for the memory block B, the policing is not applied to any of the packets. In this case, for example, the number of accesses to the memory block A from the green packet is 100 that is more than the threshold value (that is, 50), so that the policing is performed. On the other hand, the number of accesses to the memory block B from the green packet is 2000 that is more than the threshold value (that is, 50), however, the policing is not performed.

FIGS. 14A and 14B illustrate examples of access restriction. Here, it is assumed that the instructions "policing by color" and "entry deletion" are issued from the selection unit 44 to the access control circuit 33. In addition, the TCAM 22 includes five entries A to E.

The contents of FIGS. 14A and 14B respectively correspond to the contents of FIGS. 13A and 13B. As described above, FIGS. 13A and 13B illustrate the number of accesses and the condition setting for each of the memory blocks. On the other hand, FIGS. 14A and 14B illustrate the number of accesses and the condition setting for each of the entries. A method of restricting an access to the TCAM 22 for each of the entries is similar to the above-described method of restricting an access to the TCAM 22 for each of the memory blocks, and the description is omitted herein.

Other embodiments (1) The TCAM access circuit 34 includes a first access circuit that accesses the TCAM 22 N times and a second access circuit that accesses the TCAM 22 M (M<N) times. The access control circuit 33 guides an input packet to the first access circuit when not receiving an access restriction instruction from the CPU 13, and guides the input packet to the second access circuit when receiving the access restriction instruction from the CPU 13. By such a restriction operation, the number of accesses to the TCAM 22 is reduced.

(2) The access control circuit 33 may reduce a speed of a clock that is supplied to the TCAM 22 or some memory blocks of the TCAM 22 when receiving the access restriction instruction from the CPU 13.

(3) The access control circuit 33 may reduce voltage that is supplied to the TCAM 22 or some memory blocks of the TCAM 22 when receiving the access restriction instruction from the CPU 13.

(4) The access control circuit 33 may terminate a memory block having the small number of accesses when receiving the access restriction instruction from the CPU 13. By such a restriction operation, the number of packets that are not allowed to obtain the control information from the TCAM 22 is reduced.

(5) The access control circuit 33 may delete an entry having the small number of accesses when receiving the access restriction instruction from the CPU 13. By such a restriction operation, the number of packets that are not allowed to obtain the control information from the TCAM 22 is reduced.

(6) The CPU 13 continues temperature estimation of the TCAM 22 and prediction of the temperature change even during a time period in which the access control circuit 33 performs the access restriction operation. In addition, the CPU 13 issues a termination instruction of the access restriction to the access control circuit 33 when determining that the temperature of the TCAM 22 is reduced sufficiently.

(7) The prediction unit 43 may predicts the time period until the temperature of the TCAM 22 reaches the threshold temperature on the basis of the current temperature of the TCAM 22 and a trend of change in the access rate to the TCAM 22.

(8) The routing device 1 includes a database that indicates a temperature change of the TCAM 22 for a time period using an access rate to the TCAM 22 as a parameter. For example, a database that indicates the relationship illustrated in FIG. 7 is created beforehand. The prediction unit 43 periodically detects an average access rate to the TCAM 22. In addition, the prediction unit 43 predicts the time period until the temperature of the TCAM 22 reaches the threshold temperature with reference to the above-described database at the detected access rate.

(9) The prediction unit 43 may predict a time at which the temperature of the TCAM 22 exceeds the threshold temperature, instead of the time period until the temperature of the TCAM 22 reaches the threshold temperature. In this case, the access control circuit 33 starts the access restriction to the TCAM 22 at the predicted time.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission device comprising:
an associative memory in which, when data is specified, contents of the memory are searched for the data;
a detector configured to detect an access rate to the associative memory;
an estimation unit configured to estimate a temperature of the associative memory, based on the access rate to the associative memory;
a prediction unit configured to predict a time period until the temperature of the associative memory reaches a specified temperature, based on the temperature estimated by the estimation unit; and
an access controller configured to control an access to the associative memory, based on the time period predicted by the prediction unit, wherein
the associative memory includes a plurality of entries, and
the access controller deletes at least one of the plurality of entries when the time period predicted by the prediction unit elapses.

2. The transmission device according to claim 1, wherein the prediction unit predicts the time period until the temperature of the associative memory reaches the specified temperature based on a sum of a predicted change in temperature and the temperature estimated by the estimation unit.

3. The transmission device according to claim 1, wherein the access controller restricts the access to the associative memory when the time period predicted by the prediction unit elapses.

4. The transmission device according to claim 3, wherein the access controller discards a packet input to the transmission device when the time period predicted by the prediction unit elapses.

5. The transmission device according to claim 3, wherein the access controller performs policing on a packet having a low priority level, out of the packets input to the transmission device when the time period predicted by the prediction unit elapses.

6. The transmission device according to claim 1, wherein after the prediction unit predicts that the temperature of the associative memory exceeds the specified temperature, the prediction unit predicts a temperature change of the associative memory at a time interval that is shorter than a time interval at which the prediction unit predicts that the temperature of the associative memory exceeds the specified temperature.

7. The transmission device according to claim 1, wherein the prediction unit predicts a temperature change of the associative memory, based on a maximum value of an average access rate to the associative memory, which is repeatedly detected by the detector at a first time interval, and
after the prediction unit predicts that the temperature of the associative memory exceeds the specified temperature, the prediction unit predicts the temperature change of the associative memory, based on a maximum value of an average access rate to the associative memory, which is repeatedly detected by the detector at a second time interval shorter than the first time interval.

8. The transmission device according to claim 1, wherein the prediction unit outputs an alarm when the predicted time period is shorter than a specified time period.

9. A transmission device comprising:
an associative memory in which, when data is specified, contents of the memory are searched for the data;
a detector configured to detect an access rate to the associative memory;
an estimation unit configured to estimate a temperature of the associative memory, based on the access rate to the associative memory;
a prediction unit configured to predict a time period until the temperature of the associative memory reaches a specified temperature, based on the temperature estimated by the estimation unit; and
an access controller configured to control an access to the associative memory, based on the time period predicted by the prediction unit, wherein
the access controller prohibits the access to the associative memory for the packet input to the transmission device and performs flooding of the input packet to a plurality of output ports of the transmission device when the time period predicted by the prediction unit elapses.

10. A transmission device comprising:
an associative memory in which, when data is specified, contents of the memory are searched for the data;
a detector configured to detect an access rate to the associative memory;
an estimation unit configured to estimate a temperature of the associative memory, based on the access rate to the associative memory;
a prediction unit configured to predict a time period until the temperature of the associative memory reaches a specified temperature, based on the temperature estimated by the estimation unit; and
an access controller configured to control an access to the associative memory, based on the time period predicted by the prediction unit, wherein
the associative memory includes a plurality of memory blocks, and
the access controller terminates power supply to at least one of the plurality of memory blocks when the time period predicted by the prediction unit elapses.

11. A transmission device comprising:
an associative memory in which, when data is specified, contents of the memory are searched for the data;
a detector configured to detect an access rate to the associative memory;
an estimation unit configured to estimate a temperature of the associative memory, based on the access rate to the associative memory;
a prediction unit configured to predict a time period until the temperature of the associative memory reaches a specified temperature, based on the temperature estimated by the estimation unit;
an access controller configured to control an access to the associative memory, based on the time period predicted by the prediction unit,
a first access unit that is provided on an input side of the access controller and configured to search the associative memory for data included in the input packet; and
a second access unit that is provided on an output side of the access controller and configured to search the associative memory for the data included in the input packet using a search result of the first access unit, wherein
the access controller restricts the access to the associative memory from the second access unit, based on the time period predicted by the prediction unit.

12. A temperature control method of an associative memory in a transmission device that controls communication using the associative memory, the temperature control method comprising:
detecting an access rate to the associative memory;
estimating the temperature of the associative memory, based on the access rate to the associative memory;
predicting a time period until the temperature of the associative memory reaches a specified temperature, based on the estimated temperature of the associative memory; and
controlling an access to the associative memory, based on the time period until the temperature of the associative memory reaches the specified temperature, wherein
the associative memory includes a plurality of entries, and
the controlling deletes at least one of the plurality of entries when the time period predicted by the predicting elapses.

13. A transmission device comprising:
an associative memory in which, when data is specified, contents of the memory are searched for the data;
a detector configured to detect an access rate to the associative memory;
an estimation unit configured to estimate a temperature of the associative memory, based on the access rate to the associative memory;
a prediction unit configured to predict a time period until the temperature of the associative memory reaches a specified temperature, based on the temperature estimated by the estimation unit; and
an access controller configured to control an access to the associative memory, based on the time period predicted by the prediction unit, wherein
the prediction unit predicts a temperature change of the associative memory, based on a maximum value of an average access rate to the associative memory, which is repeatedly detected by the detector at a first time interval.

* * * * *